United States Patent [19]

Schaeffer

[11] Patent Number: 4,488,966
[45] Date of Patent: Dec. 18, 1984

[54] FILTER PLEAT SUPPORT MEANS

[75] Inventor: John I. Schaeffer, Orange City, Fla.

[73] Assignee: Brunswick Corporation, Skokie, Ill.

[21] Appl. No.: 429,887

[22] Filed: Sep. 30, 1982

Related U.S. Application Data

[63] Continuation of Ser. No. 302,148, Sep. 14, 1981, abandoned, which is a continuation of Ser. No. 114,736, Jan. 24, 1980, abandoned.

[51] Int. Cl.$^3$ .............................................. B01D 27/06
[52] U.S. Cl. ....................................... 210/485; 55/498; 55/500; 55/521; 210/493.5; 210/496
[58] Field of Search .................... 55/498, 500, 521; 210/483, 484, 485, 488–491, 493.1–493.5, 496, 510, 494.1

[56] References Cited

U.S. PATENT DOCUMENTS

| | | | |
|---|---|---|---|
| 2,681,155 | 6/1954 | Graham | 210/493 |
| 2,914,179 | 11/1959 | Foust | 210/493.1 X |
| 2,988,227 | 6/1961 | Harms | 210/493.2 |
| 3,043,739 | 7/1962 | Giles et al. | 210/493 X |
| 3,069,018 | 12/1962 | Bub | 210/493 |
| 3,096,281 | 7/1963 | Smith et al. | 210/493.1 X |
| 3,127,258 | 3/1964 | Revell | 210/493 X |
| 3,279,615 | 10/1966 | Stokes | 210/488 X |
| 3,280,985 | 10/1966 | Czerwonka | 210/489 |
| 3,334,753 | 8/1967 | Royer et al. | 210/493.1 X |
| 3,392,846 | 7/1968 | Getzin | 210/485 |
| 3,465,413 | 9/1969 | Rosaen et al. | 210/493 X |
| 3,520,417 | 7/1970 | Durr et al. | 210/493 |
| 3,807,150 | 4/1974 | Maracle | 210/493 X |
| 3,941,571 | 3/1976 | Getzin | 55/521 X |
| 3,994,810 | 11/1976 | Schaeffer | 210/103 |
| 4,075,106 | 2/1978 | Yamazaki | 210/493.1 X |
| 4,114,794 | 9/1978 | Storms | 55/498 X |
| 4,169,059 | 9/1979 | Storms | 210/493 |
| 4,290,889 | 9/1981 | Erickson | 210/493.2 X |

FOREIGN PATENT DOCUMENTS

| | | | |
|---|---|---|---|
| 599661 | 6/1960 | Canada | 210/493.1 |
| 758277 | 10/1956 | United Kingdom | 210/493.1 |
| 1400452 | 7/1975 | United Kingdom | 210/493.1 |

*Primary Examiner*—Robert Spitzer
*Attorney, Agent, or Firm*—Wood, Dalton, Phillips, Mason & Rowe

[57] ABSTRACT

This invention comprehends a new and unique means for preventing the crowns (forward projections of the pleats) of a backflushable filter element from splitting due to the cyclic action that is experienced during cleaning and backflushing. In one embodiment, a plurality of spacers, preferably wedge shape, is positioned between the outwardly projecting pleats of the filter media thereby preventing the splitting thereof. A plurality of spacers may also be placed between the inwardly projecting pleats to provide additional support during the cleaning and backflushing cycle. In another embodiment a ring is placed adjacent the inwardly directed pleats and the inner end cap lip; this also prevents splitting of the crowns when the filter element is subjected to the cyclic action of cleaning and backflushing.

7 Claims, 19 Drawing Figures

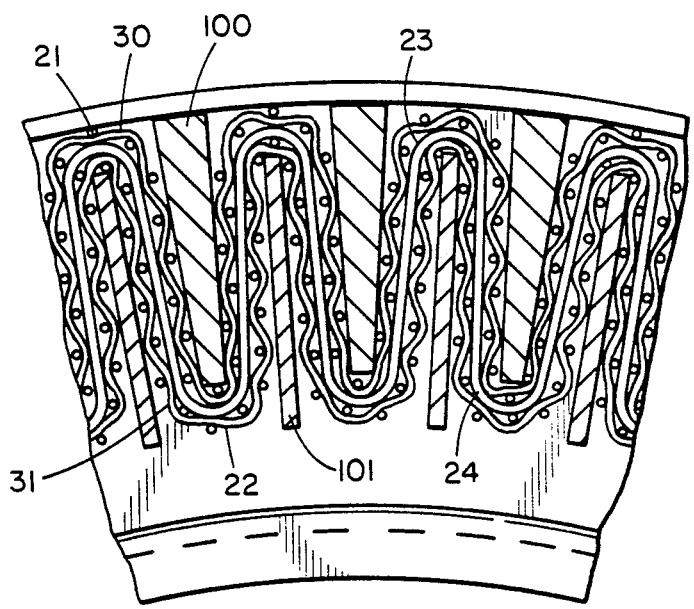
FIG.12
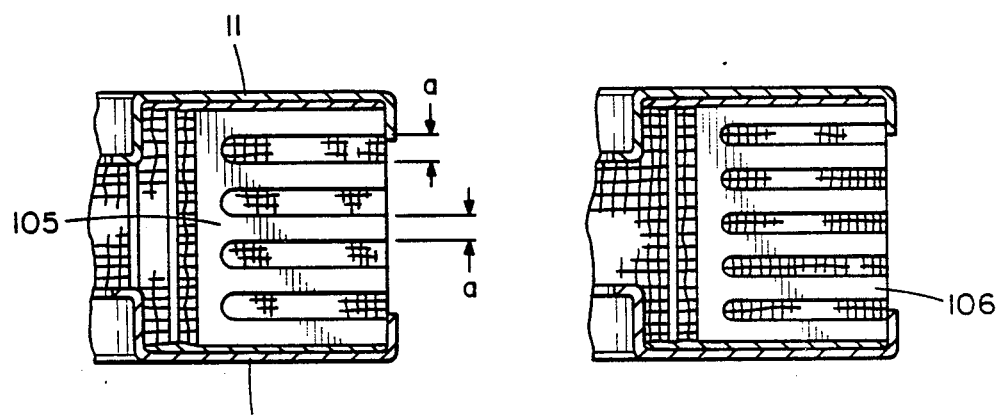
FIG.13
FIG.14
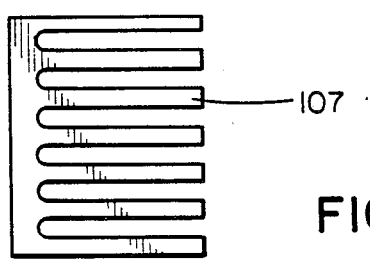
FIG.15

FILTER PLEAT SUPPORT MEANS

This is a continuation of application Ser. No. 302,148, filed Sept. 14, 1981, now abandoned, which is a continuation of application Ser. No. 114,736, filed Jan. 24, 1980, now abandoned.

BACKGROUND OF THE INVENTION

1. Field of the Invention

This invention relates to filter elements, and more particularly, to filter elements used in backflushable filter units wherein the filters suffer from premature failure due to the filtering-cleaning cycle imposed thereon. The invention comprehends a means for limiting this premature failure by incorporating a novel support system during the manufacturing of the filter.

2. Background of the Prior Art

The U.S. Pat. No. 3,994,810, a backflushable filter unit having a plurality of filter elements is taught. The filter elements therein are depicted as being cylindrical with pleated filter media being secured to the end caps of the filter elements. The prefered filter media for filtering polymers is mentioned as a metal fiber depth filter media wherein the metal fibers have a diameter from about 1 micron to about 50 microns and the media is sintered.

Generally, in the operation of filter units and including backflushable units, the flow of contaminated fluid is usually from outside the filter element into the center of the element and then out through the center of the filter housing. However, in backflushable filter units, the flow is preselectedly reversed so that some of the clean fluid is used for flowing from inside the filter element to its outside thereby cleaning it.

In such backflushable filter units, the filters are onstream filtering for a preselected period of time and then selectively switched off-stream either individually or in pairs being cleaned for a preselected period of time. The cleaning period or time required to clean the filters is dependent upon:

(1) How dirty the filters are;
(2) The type of fluid in the system;
(3) The type of contaminants;
(4) The amount of pressure drop in the device; and
(5) The desired level of cleanness.

The filtering and cleaning causes the pleated filter media of the filter elements to be subjected to a cyclic pressure effect. It has been found that under certain circumstances, such as a high differential pressure across the filter media and a high viscosity liquid being filtered, that the crowns of the pleats of some of the elements in a backflushable unit were cracking or splitting such as depicted in the photograph of FIG. 1.

It was initially believed that this splitting of the crowns was due to failure of the fastening means that was used to attach the pleated filter media to the end caps. A number of such filter elements were made in accordance with U.S. Pat. No. 4,169,059 wherein a metal fiber web is used as means for bonding the filter media to the end caps. An extensive evaluation of a plurality of such filter elements, such as those depicted in FIG. 1, indicated that the bonding means for securing the pleated filter media to the end caps was fully intact. And, thus, bonding failure was not the cause of the splitting of the crowns. Therefore, the obvious solution, making the bond stronger, would not prevent the splitting.

Thus, recognition of the splits in the crowns and the review of the prior art did not lead one to any conclusion as to how to solve the splitting problem.

SUMMARY OF THE INVENTION

This invention relates to filter elements, and more particularly, filter elements that are used in backflushable filtering units with the invention hereof fully contemplating a means for preventing the crowns of the pleats of the filter elements from cracking because they are subjected to repeated cycles of filtering and cleaning. The cracking of the crowns is solved by two distinct and unique methods.

It is therefore an object of this invention to provide a filter element with improved properties whereby it will not split in the crowns when subjected to the cyclic phenomena inherent in a backflushable filter system.

It is another object of this invention to provide such a filter element with support means positioned between the crown and the pleats of the filter element to prevent the splitting of the crowns.

It is another object of this invention to provide for a filter element with spacers located between the pleats and the crowns to prevent the splitting of the crowns.

It is still yet another object of this invention to provide such a filter element having spacers which are E-shaped that are located between the outer pleats and spacer shims that may be E-shaped located between the inner pleats.

Still yet another object of this invention is the provision whereby the spacers may be comb-shaped or corrugated.

And still another object of this invention is to provide such a filter element with support means located between the inner pleat apexes and the inner diameter of the filter end cap.

The above and other and further objects and features will be more readily understood by reference to the following detailed description and accompanying drawings.

DESCRIPTION OF THE DRAWINGS

FIG. 12 is a cross-sectional view of a portion of the filter containing the invention herein;

FIG. 13 is a cross-sectional view of a filter element containing an embodiment of the invention described herein;

FIG. 14 is a cross-sectional view of a filter element containing an embodiment of the invention described herein;

FIG. 15 is a side elevation view of a wedge in comb shape as described herein;

DESCRIPTION OF THE PREFERRED EMBODIMENTS

Figure 2:
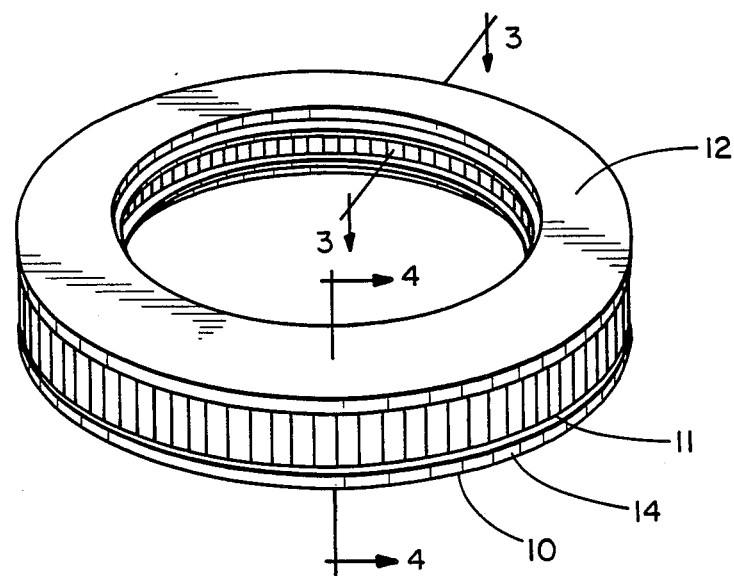
FIG. 2 is a prospective view of one style of filter element that can be used in a backflushable filter unit.
Figure 3:
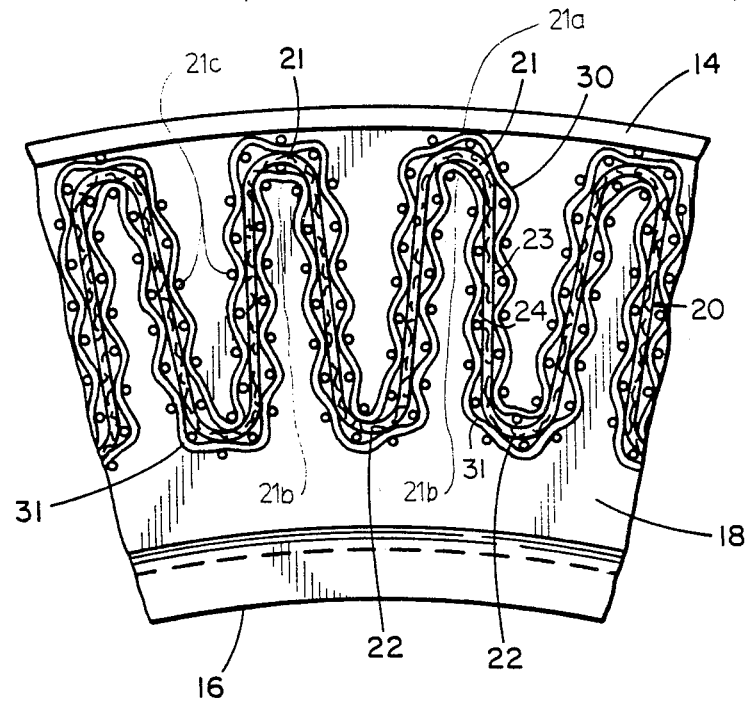
FIG. 3 is a cross-sectional view taken along line 3—3 of FIG. 2 comprising a portion of the prior art filter element.
Figure 4:
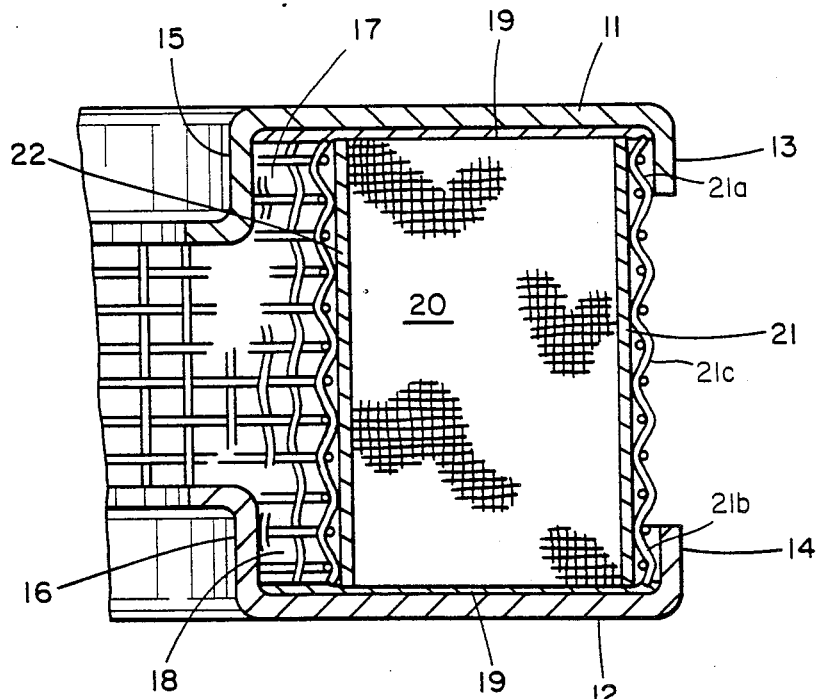
FIG. 4 is a cross-sectional view taken along line 4—4 of FIG. 2 indicating the location of the filter media and filter end caps.

A small perspective representation of a filter element is shown in FIG. 2 with FIG. 3 depicting a segment of the lower portion of the filter element of FIG. 2 taken along line 3—3. The filter media 20 has pleats 27 with crowns 21 and apexes 22. The filter media 20 is secured to the end caps 11 and 12 by bonding means 19 such as taught in U.S. Pat. No. 4,114,794. The upper end cap 11 has a forward lip 13 and an inner lip 15 with gap 17 between the apexes 22 and lip 15. And, the lower cap 12 has a forward lip 14 and an inner lip 16 with gap 18 between the apex 22 and the lip 16. The crown 21 is extremely close to the forward lips 13 and 14 and in some instances when the bonding means 19 actually falls over the edge of the lip the very top edge of the crown 21 can be secured at 21a and 21b. The filter element 10 will be of any size compatible with the filter housing used to hold it.

Figure 1:
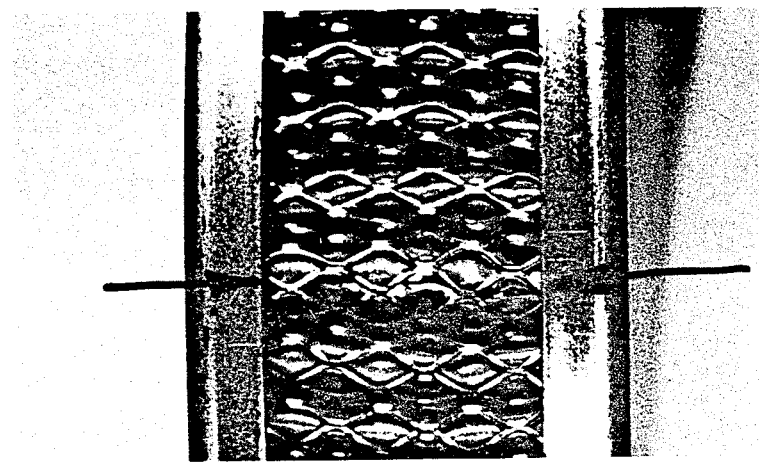
FIG. 1 is a photographic representation of a partial segment of a prior art filter element depicting a split crown indicated by opposing arrows.
Figure 5:
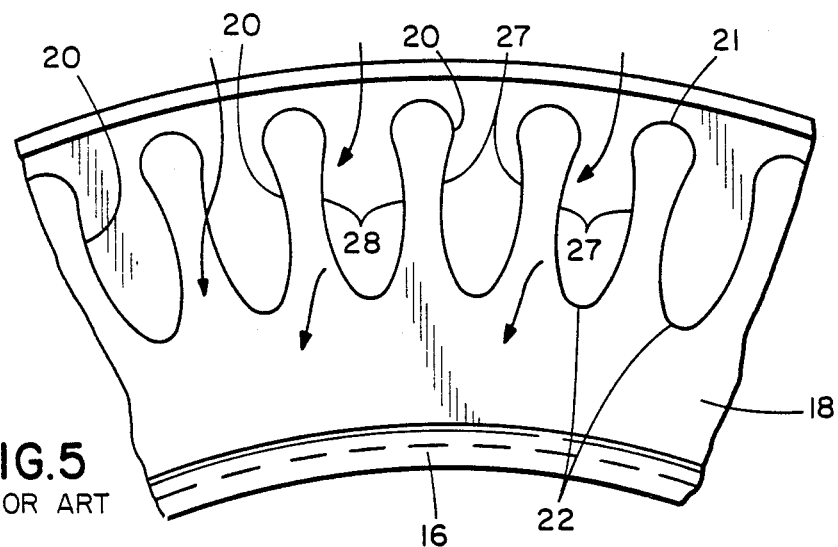
FIG. 5 is a partial cross-sectional view taken along line 3—3 of FIG. 2 and represents the prior art filter element during its normal filtering cycle and depicting the filter media bellowing or ballooning inwardly toward the center of the filter.
Figure 6:
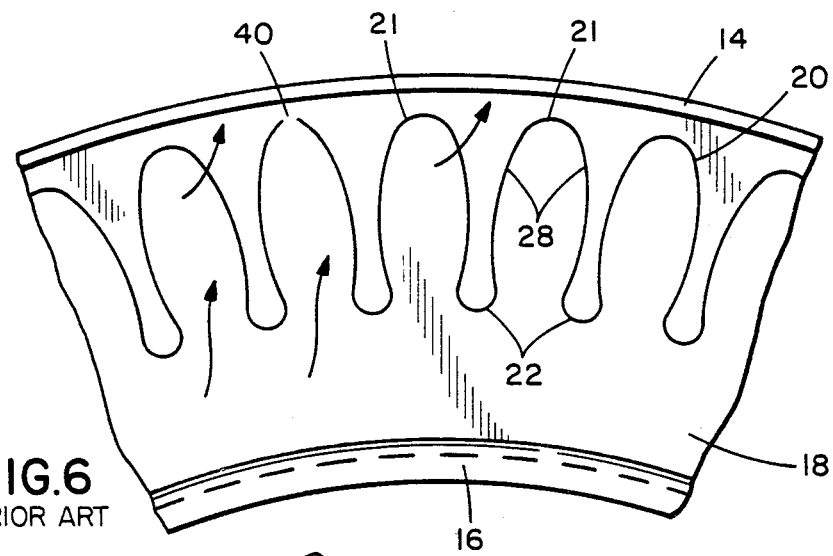
FIG. 6 is a partial cross-sectional view taken along line 3—3 of FIG. 2 and represents the prior art filter during a backflushing portion of a cycle depicting the filter media as slightly bellowing or ballooning outwardly.

It was found that when the filter element 10 is normally filtering in a backflushable filter unit such as that taught by U.S. Pat. No. 3,994,810 that the filter media 20 appears to balloon slightly inward such as shown in FIG. 5. In fact, in a backflushable unit where fluid is forced both ways through the filter media, it is thought that such filter media pleats 27 act as diaphragms wherein the adjacent pleats 27 (those separated by apexes 22) are forced apart during the normal filtering cycle. The arrows in FIG. 5 represent the fluid flowing through the filter media. When the flow is reversed and the filter is being backflushed or cleaned, the filter media pleats 27 (again those separated by apexes 22) are forced together such as shown in FIG. 6; the arrows indicating the path of the flow of the fluid. Thus, the filtering and backflushing cycle causes the pleats 27 to move in and out, mostly at their center 28, in a diaphragmic movement without breaking their seal with the bonding means to the end caps. The top crown 21a and bottom crown 21b are restricted from movement due to the relative closeness to and support provided by lips 13 and 14. It is therefore believed that the location of maximum stress due to this diaphragmic movement is located in the crown 21 and possibly at the center 21c. This diaphragmic movement seems to prematurely cause one or more of the crowns to split open when the fluid passing through the filter unit has a high viscosity and there is a high pressure drop across the filter material. The photograph of FIG. 1 depicts a portion of part of a filter element used in a backflushable filter unit such as the backflushable unit shown in U.S. Pat. No. 3,994,880. A cross-sectional view of a split crown 21 similar to that shown in FIG. 1 is shown in FIG. 6 at 40. When this split occurs, the filter unit becomes inoperable because contaminated fluid can pass through this breach without being filtered. It has been ascertained that the splitting crowns will occur more when fluid having a viscosity of approximately 100 poise or more is being filtered and the pressure drops across the filter media is about 100 psia or more.

In a typical construction of the backflushable element 10 as shown in partial cross-section in FIG. 3 the filter media 20 can be made from a metal fiber web material that is sintered. This filter media 20 may be faced on its outer surface 23 by an outer metal wire screen 30. Sometimes, the media 20 may also be faced on the inner surface 24 by a metal wire screen 31. These wire screens 30 and 31 are generally lightweight metal screens; typically, these screens are 24×24 mesh made of 11 mil wire, 16×16 mesh made of 18 mil wire and 10×10 wire mesh made from 25 mil wire. Expanded metal sheets having a thickness of from about 20 mils to about 30 mils may be substituted for the metal screen wire. The size of the screen or expanded metal is predicated on (1) the size of the filter element, (2) the number of pleats of the element and (3) the size of a pleat in order to be compatible therewith.

Figure 7:
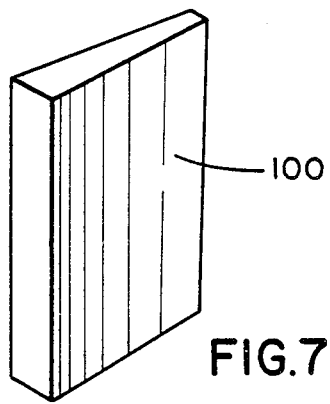
FIG. 7 is a perspective view of a wedge as described herein.
Figure 7A:
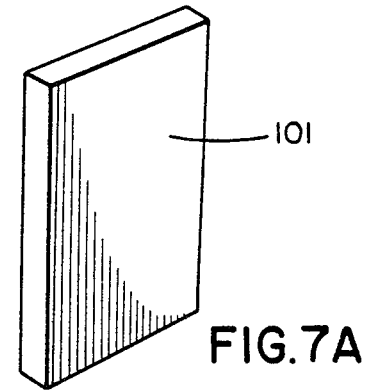
FIG. 7A is a perspective view of a shim as described herein.
Figure 11:
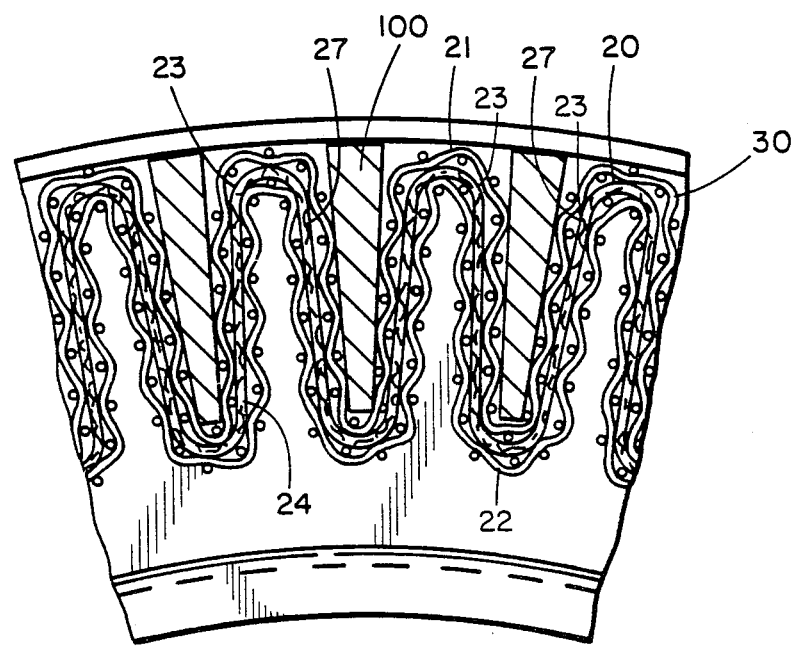
FIG. 11 is a cross-sectional view of a portion of the filter containing the invention herein.

Quite surprisingly, it has been found, as a prefered embodiment of the invention that an anti-bellowing means prevents the diaphragmic movement of the pleats and may comprise a three-dimensional wedge 100 or shim 101 that can be placed adjacent the outer surface 23 of the media 20. The wedge 100 is depicted in FIG. 7 and the shim 101 is depicted in FIG. 7A. In FIG. 11, the wedge 100 is shown between the outer surface 23 of the pleats 27, although the shim 101 can be substituted therefor. It has been found desirable to have the metal wire screen 30 exterior to the outer surface 23 of the media 20. The screen 30 provides a three-dimensional structure on the exterior of the surface 23 with the woven characteristics of the screen providing a flow path between the wedge 100 and the outer surface 23. The wedge controls and substantially reduces the outer movement of the media 20, and more particularly, prevents outward movement of the center 28 of the pleat 27 when the filter element is a the backflushable filter element and mounted in a backflush mode. Since the pleats 27 are usually formed around a cylindrical core, the space between crowns 21 is tapered to a greater extent than the space between the apexes 22. Thus, a wedge-shaped spacer 100 fits tighter into the space than a flat shim. It has been satisfactorily ascertained that the wedge 100 positioned between the outer surface 23 of the pleats 27 provides a unique means for prolonging the life of a backflushable filter elememt.

In addition to the wedge 100 positioned between the pleats 27 of the outer surface, 23 as shown in FIG. 12, the shims 101 are positioned between the pleats 27 at the inner surface 24. The metal wire screen 31 performs the same function as the screen 30. The shim 101 supports and substantially prevents diaphragmic movement of the pleated media 20 during the regular filtering cycle. With both the wedge 100 and shim 101 facing each pleat 27, the filter media can be subjected to repeated cleaning cycles with fluids having viscosities of 1,000 poise and even more. It has been found that it is not essential that the wedge 100 or shim 101 be secured to the end caps 11 and 12. However, the wedges 100 and shims 101 must be selected from material that is compatible with the media 20 (and screens 30 and 31 if they are used). In the event that the media 20, screens 30 and 31, wedges 100 and shims 101 are all of the same material or material system, then it is possible that the wedges 100 and/or shims 101 may be secured to either one or both of the end caps by the bonding means 19. By choosing the wedge 100 and/or shim 101 material properly, or by providing special coatings thereon, it is possible to predetermine whether or not the wedge 100 or shim 101 can be or will be secured to the end caps 11 or 12.

Figure 8:
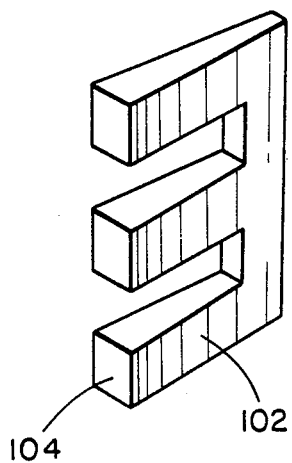
FIG. 8 is a perspective view of a wedge as described herein.
Figure 9:
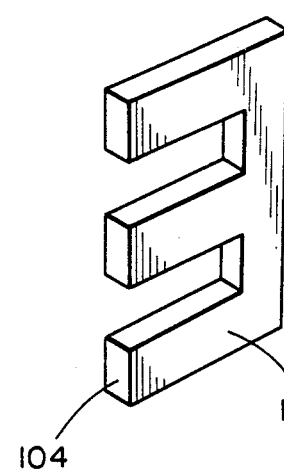
FIG. 9 is a perspective view of a shim as described herein.

In another embodiment of the invention, shown in FIG. 8, an E-shaped wedge 102 is depicted and in FIG. 9 an E-shaped shim 103 is depicted. The E-shaped wedge 102 and shims 103 are spacers that can be substituted for the wedges 100 and shims 101 to provide for greater unobstructed flow through the filter than the solid wedges and shims. The E-shaped spacers also provide for less pressure drop across the filter element; and, thus, require less energy to force the contaminated fluid through the filter media 20. For most efficient use of the E-shaped spacers, the solid vertical segment of the E is closest to the inner portion of the crowns 21 and the apexes 22. The E-shaped spacers are positioned similar to the wedges 100 and shims 101 spacers shown in FIGS. 11 and 12.

In another embodiment of the invention comb-like wedges and shims 105, 106 and 107 are shown in FIGS. 13, 14 and 15. Instead of having a three prong and two space comb arrangement (E-shaped), as shown in FIGS. 8 and 9, the wedges and shims can have a plurality of teeth and spacers, as desired. Obviously the number of teeth and the size thereof are determined by the size of the filter element and the characteristics of the fluid to be filtered. For a filter pleat 27 ranging from about one square inch to about two square inches, it has been found desirable to have the teeth and spacers each about 1/16 inch to ⅛ inch wide (dimension "a" in FIG. 13). In one prefered embodiment, the teeth and spacers are each 3/32 inch (93 mils) wide.

Figure 10:
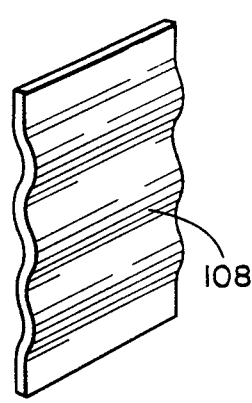
FIG. 10 is a perspective view of a corrugated wedge as described herein.

In yet another embodiment of the invention, as shown in FIG. 10, a corrugated spacer 108 can be substituted for the wedge 100 and for the shim 101. In fact, it is fully contemplated that more than one type of spacer can be used in one filter element at a time if desired.

Figure 16:
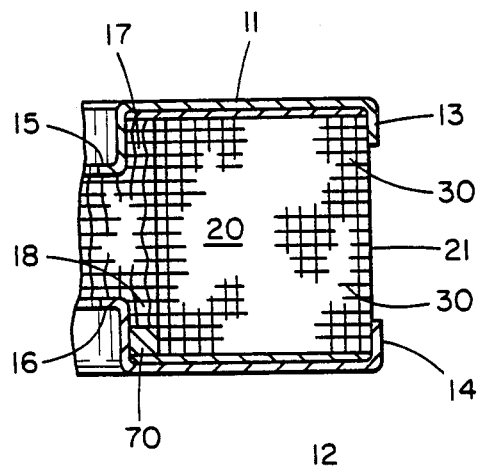
FIG. 16 is a side cross-sectional view of a filter element containing an embodiment of the invention described herein.
Figure 18:
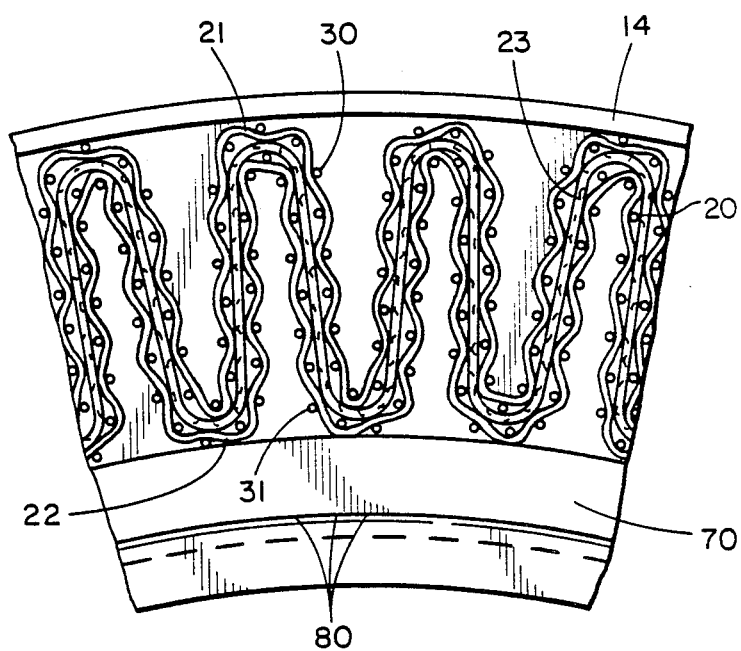

Quite surprisingly, in another embodiment of the invention a ring 70, as shown in FIGS. 16 and 18, is positioned in gap 18 between the inner lip 16 and the bottom of the apex 22. A circular ring 70 is split and forced into the gap 18. The ring is then spot welded at 80 to the lip 16 to maintain its position relative to the gap 18 and the apexes 22. The ring 70 can touch the edge of the apexes 22 or the screen 31 or be spaced slightly from the apexes, as desired. The assembly of the filter element 10 and the pleated filter media 20 and the screens 30 and 31 are generally positioned with a tolerance ranging from ±1/32 inch to as much as ±⅛ inch, depending upon the size of the filter. It has been found advantageous to have the ring 70 as close to the apexes 22 as possible. Thus, after the filter media 20 (and screens 30 and 31, if used) is assembled into the end caps 11 and 12 (and before the bonding of the media to the end caps) and the ring 70 is positioned and spot welded to the lip 16, the ring 70 will usually contact most of the apexes 22.

Figure 17:
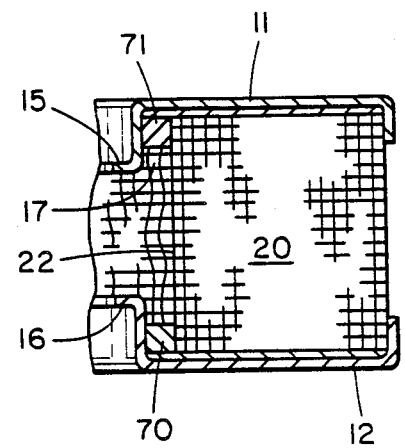
FIG. 17 is a side cross-sectional view of a filter element containing an embodiment of the invention described herein; and, FIG. 18 is a cross-sectional view of a portion of the filter containing an embodiment of the invention described herein.

In another embodiment of the invention, as shown in FIG. 17, a second ring 71 is used in the other gap 17. The results achieved from the invention hereof are quite surprising and cannot be fully explained by the inventor. The reason for the synergistic effect of a metal ring 70 adjacent the inner lip 16 and the apexes 22 to prevent the crowns 21 from slitting is unknown at this time.

The following filter elements 20 were manufactured with each element having an outside diameter of about 8½ inches, an inside diameter of about 5½ inches, a filter media size of about 1 inch by 1¼ inch and the thickness between end caps 11 and 12 of about 1 1/38 inch. All the end caps of the elements are bonded to the media in accordance with U.S. Pat. No. 4,114,794.

EXAMPLE I

The element had filter media made from a sintered metal fiber web having a thickness of 25 mils and a density of approximately 20%. Adjacent the outer surface of the media was a layer of 24×24 wire mesh screen having wires 11 mils in diameter. Adjacent the inner layer of the media was a 10×10 screen wire made of a 25 mil diameter wire. The element had 108 pleats with a filter media area of 1.9 square feet.

EXAMPLE II

The element had filter media made from a sintered web of metal fiber having a thickness of about 15 mils and a density of about 20%. Adjacent the outer surface of the media was a layer of 16×16 metal wire screen made from a wire having a diameter of 18 mils. Adjacent the inner layer of the media was a 16×16 screen wire material made from wire having an 18 mil diameter. The filter element had 120 pleats with a filter media area of 2.12 square feet.

EXAMPLE III

The filter element had filter media from a sintered metal fiber web having a thickness of approximately 15 mils and a density of about 20%. Adjacent the outer surface of the media was a layer of expanded metal approximately 30 mils thick and having openings approximately ⅛ inch×¼ inch. Adjacent the inner layer of the media was a layer of expanded metal approximately 30 mils thick and having openings of about ⅛ inch×¼ inch. This element had 133 pleats with a filter media area of about 2.34 square feet.

EXAMPLE IV

The element had filter media made from a sintered metal fiber web having a thickness of about 15 mils and a density of about 20%. There was nothing adjacent the outer surface of the media. Adjacent the inner surface of the media was a layer of expanded metal approximately 30 mils thick and having openings of about ⅛ inch×¼ inch. The filter element had 126 pleats and a filter media area of 2.22 square feet.

EXAMPLE V

The element had filter media made from a sintered metal fiber web having a thickness of about 0.015 inches and a density of approximately 20%. Adjacent the outer surface of the media was a layer of 16 by 16 wire screen mesh made from 18 mil diameter wire. Adjacent the inner surface of the media was a layer of 16 by 16 wire screen mesh made from 18 mil diameter wire. Positioned between the apex and the inner lip of the bottom end cap was a metal ring filling the space therebetween. The element had 120 pleats with a filter media area of 2.12 square feet.

EXAMPLE VI

The element had filter media made from sintered metal fiber web having a thickness of 0.015 inches and a density of approximately 20%. Adjacent the outer surface of the media was a layer of 16 by 16 wire screen mesh made from 18 mil diameter wire. Adjacent the inner surface of the media was a layer of 16 by 16 wire screen mesh made from 18 mil diameter wire. Positioned between the outer pleats were solid metal wedges and positioned between the inner pleats were solid metal shims. The filter element had 94 pleats and a filter media area of 1.66 square feet.

EXAMPLE VII

The element had filter media made from a sintered metal fiber web having a thickness of 0.015 inches and a density of approximately 20%. Adjacent the outer surface of the media was a layer of expanded metal approximately 30 mils thick and having openings of approximately ⅛ inch by ¼ inch. Adjacent the inner surface of the media was a layer of expanded metal approximately 30 mils thick and having openings approximately ⅛ inch by ¼ inch. Positioned between the outer pleats was a plurality of solid metal wedges and positioned between the inner pleats was a plurality of solid metal shims. The filter element had 105 pleats with a filter media area of 1.85 square feet.

EXAMPLE VIII

The element had filter media made from a sintered metal fiber web having a thickness of about 0.015 inches and a density of approximately 20%. Adjacent the outer surface of the media was a layer of 16 by 16 wire screen mesh made from 18 mil diameter wire. Adjacent the inner surface of the media was a layer of 16 by 16 wire screen mesh made from 18 mil diameter wire. Positioned between the outer pleats were solid metal wedges. The filter element had 104 pleats with a filter media area of 1.83 square feet.

EXAMPLE IX

The element had filter media made from a sintered metal fiber web having a thickness of about 0.015 inches and a density of approximately 20%. Adjacent the outer surface of the media was a layer of expanded metal approximately 30 mils thick and having openings of approximately ⅛ inch by ¼ inch. Adjacent the inner surface of the media was a layer of expanded metal approximately 30 mils thick and having openings approximately ⅛ inch by ¼ inch. Positioned between the outer pleats was a plurality of E-shaped metal wedges and positioned between the inner pleats was a plurality of E-shaped metal shims. The filter element had 105 pleats with a filter media area of 1.85 square feet.

EXAMPLE X

The element had filter media made from a sintered metal fiber web having a thickness of 0.015 inches and a density of approximately 20%. Adjacent the outer surface of the media was a layer of 16 by 16 wire screen mesh made from 18 mil diameter size. Adjacent the inner surface of the media was a layer of 16 by 16 wire screen mesh made from 18 mil diameter wire. Positioned between the outer pleats was a plurality of E-shaped metal wedges and positioned between the inner pleats was a plurality of E-shaped metal shims. The filter element had 94 pleats with a filter media area of 1.66 square feet.

EXAMPLE XI

The element had filter media made from a sintered metal fiber web having a thickness of approximately 0.015 inches (X9) and a density of approximately 20%. Adjacent the outer surface of the media was a layer of expanded metal approximately 30 mils thick and having openings of approximately ⅛ inch by ¼ inch. Adjacent the inner surface of the media was a layer of expanded metal approximately 30 mils thick and having openings approximately ⅛ inch by ¼ inch. Positioned between the outer pleats was a plurality of E-shaped metal wedges and positioned between the inner pleats was a plurality of E-shaped metal shims. The filter element had 115 pleats with a filter media area of 2.02 square feet.

All the Examples were tested in a backflushable unit simulator and subjected to the same cycling flow of silicon oil having a viscosity of about 1,000 poise. Each filter element was subjected to a differential pressure of approximately 150 psia. The filters were checked periodically to see whether or not there was any splitting at the crowns. If a crown split, it was immediately noted. The following table indicates the results of these tests.

| Example No. | Type | Support | Cycles |
|---|---|---|---|
| I | Prior Art | none | 900 |
| II | Prior Art | none | 400 |
| III | Prior Art | none | 250 |
| IV | Prior Art | none | 1350 |
| V | Screen | ring | 10,000 |
| VI | Screen-solid wedge | ID-OD | 10,319 |
| VII | Expanded metal-solid wedge | ID-OD | 11,650 |
| VIII | Screen-solid wedge | OD | 11,382 |
| IX | Expanded metal-E-shaped | ID-OD | 6,000 |
| X | Screen-E-shaped | ID-OD | 11,000 |
| XI | Expanded metal-E-shaped | ID-OD | 22,000 |

The inventive filter elements perform from six times to twenty times better than the prior art; preventing the anti-bellowing movement of the media prevents the splitting of the crowns. Exactly how this anti-bellowing is accomplished by the ring structure is as yet unknown. It is fully contemplated that the wedges and/or shims can have holes, grooves, channels, etc., to enhance the flow around the filter media.

Although specific embodiments of the invention have been described, many modifications and changes may be made in the device without departing from the spirit and scope of the invention as defined in the appended claims.

What is claimed is:
1. A fluid filter element for use in a system having fluid flowing first in one direction through the filter element and the flow then being reversed to flow in the opposite direction through the filter element, the filter element comprising:

(a) a pair of spaced end caps;

(b) a pleated filter media comprised of substantially rigid pleated porous metal material extending between the end caps and secured thereto, the media having a plurality of spaced apart outer pleats with outwardly projecting crowns and a plurality of spaced apart inner pleats with inwardly projecting apexes;

(c) first spacer means not secured to the filter media, having at least a portion situated between adjacent outer pleats and extending continuously between the end caps and mounted in juxtaposed relationship with the adjacent outer pleats to maintain a separation between the outer pleats along the axial length of the outer pleats and to prevent the ballooning movement of the outer pleats toward each other when the fluid is forced through the media in a direction from the inner pleats through the outer pleats, the first spacer means are wedge shaped members having a wide part near the crowns and a narrower part near the apexes and each wedge shaped member has opposite free face portions in non-attached supporting relationship with the adjacent outer pleats; and (d) second spacer means not secured to the filter media having at least a portion situated between adjacent inner pleats and extending continuously between the end caps and mounted in juxtaposed relationship with the adjacent inner pleats to prevent the ballooning movement of the inner pleats toward each other when the fluid is forced through the media in a direction opposite to the first named direction of forced flow, the second spacer means are shim members with each shim member having opposite free face portions in non-attached relationship with the adjacent inner pleats;

(e) the first and second spacer means having a plurality of elongated radial teeth and open spaces axially therebetween.

2. The element of claim 1 wherein the filter element is cylindrical in shape and wherein said crowns are radially outward of the outer pleats and said apexes are radially inward of the inner pleats.

3. The element of claim 1 wherein the fluid being filtered has a viscosity of approximately 100 poise or more and the pressure drop across the media is 100 psia or more.

4. The element of claim 1 wherein the porous metal material is a sintered web of metal fibers.

5. The element of claim 4 wherein the metal fibers have a size range from about 1 micron to about 50 microns.

6. The element of claim 4 wherein the web has a density range from 10% to 40%.

7. The element of claim 1 further including a porous metal layer adjacent the outer surface of the porous metal material.

* * * * *